(12) United States Patent
Achtermann et al.

(10) Patent No.: US 7,769,822 B2
(45) Date of Patent: Aug. 3, 2010

(54) METHOD FOR DISTRIBUTING FILE CONTENT FROM A SELECTED TARGET DEPOT SERVER IN RESPONSE TO MULTIPLE CLIENT REQUESTS

(75) Inventors: Jeffrey Mark Achtermann, Austin, TX (US); Lawrence H. Maddox, Jr., Austin, TX (US); Liliana Orozco, Del Valle, TX (US); Patrick Leo Woods, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 11/778,817

(22) Filed: Jul. 17, 2007

(65) Prior Publication Data

US 2009/0024693 A1 Jan. 22, 2009

(51) Int. Cl.
*G06F 15/16* (2006.01)
(52) U.S. Cl. .................... 709/218; 709/202
(58) Field of Classification Search .......... 709/203
See application file for complete search history.

(56) References Cited

U.S. PATENT DOCUMENTS

| | | | |
|---|---|---|---|
| 6,144,996 A * | 11/2000 | Starnes et al. | 709/217 |
| 6,330,602 B1 | 12/2001 | Law et al. | |
| 6,801,911 B1 | 10/2004 | Berstis | |
| 7,219,153 B1 * | 5/2007 | Day | 709/229 |
| 2005/0114296 A1 * | 5/2005 | Farber et al. | 707/1 |
| 2006/0129695 A1 | 6/2006 | Faibish et al. | |
| 2007/0180335 A1 * | 8/2007 | Greenberg et al. | 714/46 |
| 2008/0071859 A1 * | 3/2008 | Seed et al. | 709/203 |

OTHER PUBLICATIONS

Hao et al., "Collaborative Computing: A Multi-Client Multi-Server Environment", 1995, ACM Digital Library, pp. 206-213.
Venugopal et al., "A Taxonomy of Data Grids for Distributed Data Sharing, Management, and Processing", ACM Computing Surveys, vol. 38, Mar. 2006, Article 3, pp. 1-53.

* cited by examiner

*Primary Examiner*—Patrice Winder
*Assistant Examiner*—Taylor Elfervig
(74) *Attorney, Agent, or Firm*—Yee & Associates, P.C.; Jeffrey S. LaBaw

(57) ABSTRACT

In a content delivery network comprising multiple servers positioned at different locations, and including clients respectively located closer to one of the servers than to others, a method distributes specified file content to respective clients. The method initially uploads the specified content to a particular server, and generates a download plan for replicating the specified content at one or more other servers in successive stages, wherein each of the other servers is designated as a target server. The clients are notified, when the specified content is available for downloading at each target server. One mode of operation, of the target servers, immediately serves the specified content to a given client from the target server; another mode notifies the given client of the amount of time remaining until the target server completes replicating the specified content.

20 Claims, 6 Drawing Sheets

METHOD FOR DISTRIBUTING FILE CONTENT FROM A SELECTED TARGET DEPOT SERVER IN RESPONSE TO MULTIPLE CLIENT REQUESTS

BACKGROUND OF THE INVENTION

1. Field of the Invention

The invention disclosed and claimed herein generally pertains to a method for enabling specified file content, in a content data network, to be distributed from a particular selected depot server to multiple clients. More particularly, the invention pertains to a method of the above type wherein the file content can be delivered to a comparatively large number of clients, who all request the content from the same depot server simultaneously, or within a narrow time window. Even more particularly, the invention pertains to a method of the above type wherein clients are informed that the specified file content is being made available for downloading, when the content is first uploaded to a depot server of the content data network, and multiple clients can all get the file content from a single source.

2. Description of the Related Art

The Internet was designed to provide a core network that is relatively simple, by moving components that require more intelligence to network end-points, such as to hosts and clients. The core network is therefore specialized, simplified and optimized to transport only data packets. In view of this, content delivery networks (CDN) have been developed to augment the end-to-end transport network, by using intelligent applications that employ techniques designed to optimize delivery content. A content delivery network is generally a system of computers that are networked together across the Internet, and cooperate transparently to deliver content such as large media data files to end users.

In making data file content or the like available for downloading to clients who request it, it is generally advantageous to position the content in locations that are close to the clients. The content can be uploaded or published from a source to a depot server repository, and can then be replicated from the repository to other depot servers. In order to minimize wide area network (WAN) bandwidth, the replication to other depot servers is usefully fanned out in stages by the distribution application, first to the closest depot servers, and then to the depot servers that are closest to those servers. It would usually require substantial WAN bandwidth to download the specified content directly to each of the clients from the original source location. Accordingly, in an arrangement wherein a number of clients are located at an isolated branch office or the like, a single depot server is also located at the branch office, proximate to each of the clients. The content is first replicated at this depot server, and then downloaded to each client over a local area network (LAN) associated with the branch office.

In one current approach, clients are told to download specified file content right after the content has initially been loaded into the depot server repository, as described above. In this case, because of the inherent delay in replicating the content to other depot servers, many or all of the clients will immediately go to the initially loaded depot server repository, where the entire content will definitely be available. This situation can result in conflicts and delays, and extensive use of WAN bandwidth.

In an alternative approach, a particular depot server will broadcast the availability of specified content to its associated clients, after the content has been replicated into the particular server. However, this procedure requires a client to know that it is interested in the specified content, and also requires a client to be listening for the availability message.

It would generally be beneficial to improve efficiency in providing specified content to multiple clients, such as to multiple clients from a single branch office source. A useful goal would be to download the specified file content into a branch office source only once. All the clients at the branch would then wait to get the file content from that source.

SUMMARY OF THE INVENTION

In a content delivery network comprising multiple depot servers positioned at different locations, and further comprising clients that are respectively located closer to one of the depot servers than to other of the depot servers, a method is provided for distributing specified file content to respective clients. The method comprises the steps of initially uploading the specified content to a particular one of the depot servers, and generating a download plan for replicating the specified content at one or more other depot servers in successive stages, wherein each of the other depot servers is designated as a target depot server. Each of a multiplicity of the clients is notified, when the uploading of the specified content to the particular depot server has been completed, that the specified content is being made available for downloading at each of the target depot servers. The method further includes operating a selected target depot server in one or more modes selected from a set of modes, in order to enable clients of the multiplicity to download the specified content from the selected target depot server. One of the modes comprises immediately serving the specified content to a given client from the selected target server, and another mode comprises notifying the given client of the amount of time remaining until the selected target server completes replicating the specified content.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Some content delivery networks (CDN) make use of a software application known as Dynamic Content Delivery (DCD), which is designed for use in distributing file content. In the DCD application, an upload and replication model is followed, wherein the content is initially uploaded to a depot server repository. An application such as DCD keeps a catalog or record of where specified file content is located in the CDN system. Also, the application notifies respective clients when the content becomes available for downloading, and tells them to take such action. Then, when a client submits a request to proceed with downloading, the application responds by providing the client with a download plan, which is a list of all sources that have the specified content. Thereupon, the client connects to one of those sources to obtain the content.

In the environment of a CDN of this type, content that clients will need and will request is known. Thus, this environment differs significantly from the environment of the Internet, wherein the requests that the client will make are generally not known. However, a process wherein file content is replicated to depot servers in successive, gradual stages, as described above, tends to be very unpredictable. As a result, it can be quite difficult to determine the time at which clients should be notified that particular content has become available for downloading. Embodiments of the invention are intended to address this difficulty.

Figure 1:
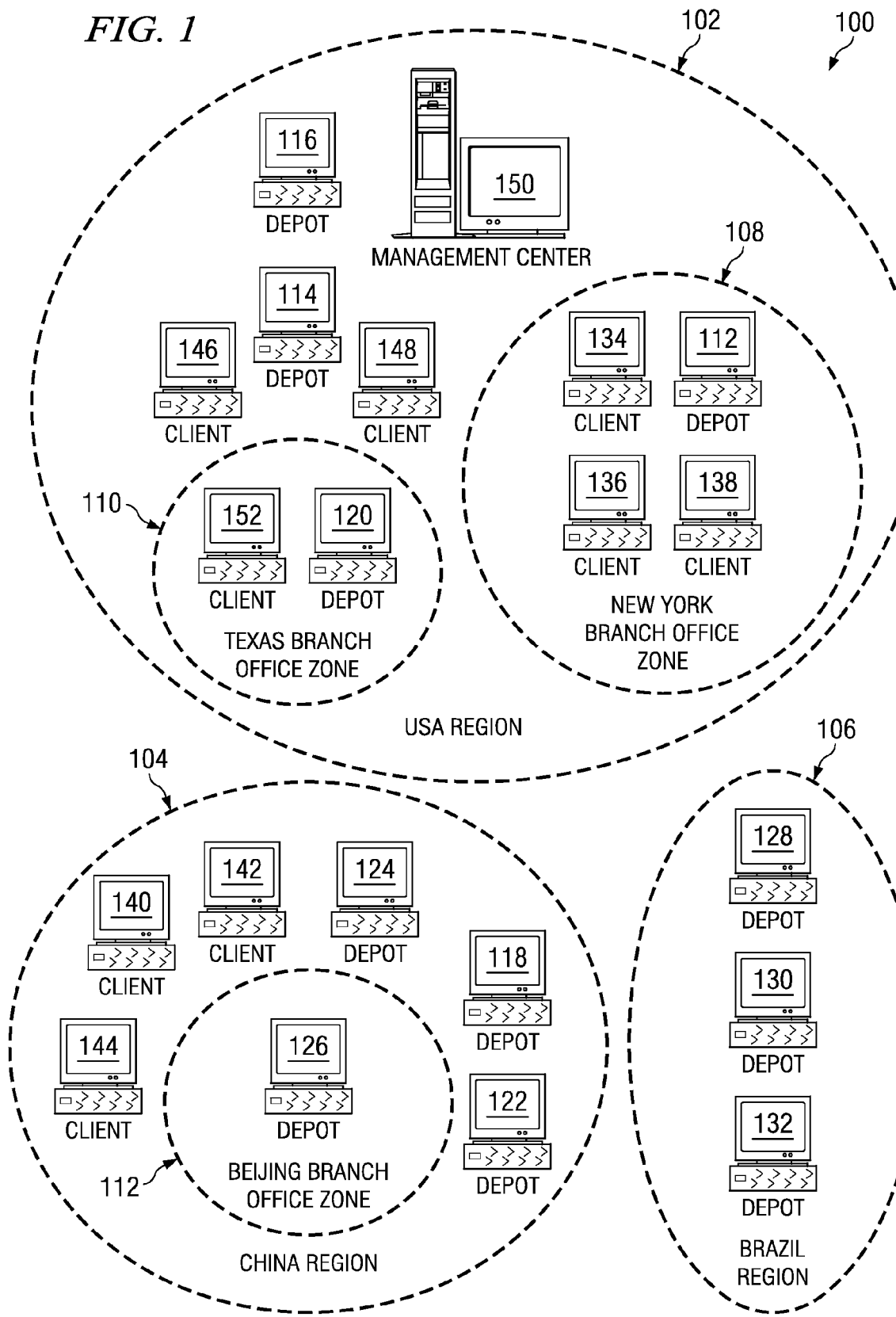
FIG. 1 is a schematic view illustrating a content delivery network in which an embodiment of the invention is implemented.

Referring to FIG. 1, there is shown a content delivery network (CDN) 100 that comprises a number of geographic regions, such as USA, China, and Brazil regions 102-106, respectively. Region 102 further includes branch office zones 108 and 110, and region 104 includes a branch office zone 112. CDN 100 is a distributed network configured to efficiently move data content, including large data files, from one location of the network to another. CDN 100 is further configured, as described hereinafter in further detail, to download the same file content to multiple clients with significantly increased efficiency, in accordance with an embodiment of the invention.

To achieve these results in part, depot servers 112-132 are strategically located in respective regions or zones, so that each depot server is physically close to groups of clients. FIG. 1 shows exemplary clients and groups of clients, such as clients 134-138 proximate to depot server 112, clients 140-142 proximate to depot server 124, clients 146-148 proximate to depot server 114 and client 152 proximate to server 120. Generally, when a client submits a request to download file content, a content distribution application, such as the CDC application described above, notifies the client of the closest depot server or other source for the file content. Then, the client can download the content from the closest depot server or other source, and thus avoid any need to download the content over a great distance, such as from one part of the world to another. The content distribution application is located at the management center 150 of CDN 100. This application usefully comprises a distributed, grid-like service for efficiently moving large files around a network, and allowing such files to be downloaded by multiple clients.

It is to be emphasized that a principal goal of embodiments of the invention is to enable files to be downloaded to a branch office or the like once and only once. After one source in the branch starts downloading the file, all clients associated with the branch wait to get the file from that source.

In order to use CDN 100 to distribute file content in accordance with an embodiment of the invention, the content is initially uploaded into one of the depot servers, under the direction of the content distribution application. The file content can comprise an entire data file, or may be a specified segment or portion of a file. Also, the file content initially may be uploaded or published from a client or other source. For example, if certain file content that is needed elsewhere resides in a client 152 of branch office zone 110, the content would initially be published from client 152 to depot server 120, the closest server to client 152.

In typical operation of the content distribution application, an upload of specified file content to depot server 152 would be accompanied by deployment specifications or the like, which identify clients in CDN 100 that need to receive the specified content. The deployment specifications would be processed by the content distribution application, in order to generate a download plan for the content that was published to server 120. For example, the deployment specifications could indicate that the uploaded content was needed by clients 134-138 in the New York branch office zone 108, and was also needed by clients 140-144 in China region 104. Based on these specifications, the distribution application would generate a plan that designated depot servers 116, 112, and 124 as respective target depot servers. The plan would also direct replications of the specified file content, initially uploaded to depot server 152, to take place in successive stages. Thus, in the first stage the content would be replicated from initial server 120 to target depot server 116. Then, in the second stage, the content would be replicated from server 116 to depot server 112 in zone 108, and would also be replicated from server 116 to depot server 124 in region 104.

When the specified file content is initially uploaded to depot server 120, the distribution application broadcasts a message to clients that need the content, such as clients 134-138 and 140-144. The message informs the clients that the content is in the process of being made available for download. Upon receiving this message, respective clients seek to download the file content, by submitting requests to the content distribution application at management center 150. In response, each requesting client is sent the download plan. The download plan notifies each client of the target depot server that is closest to the client, and that the target depot server either has received or will receive the specified file content.

Figure 2:
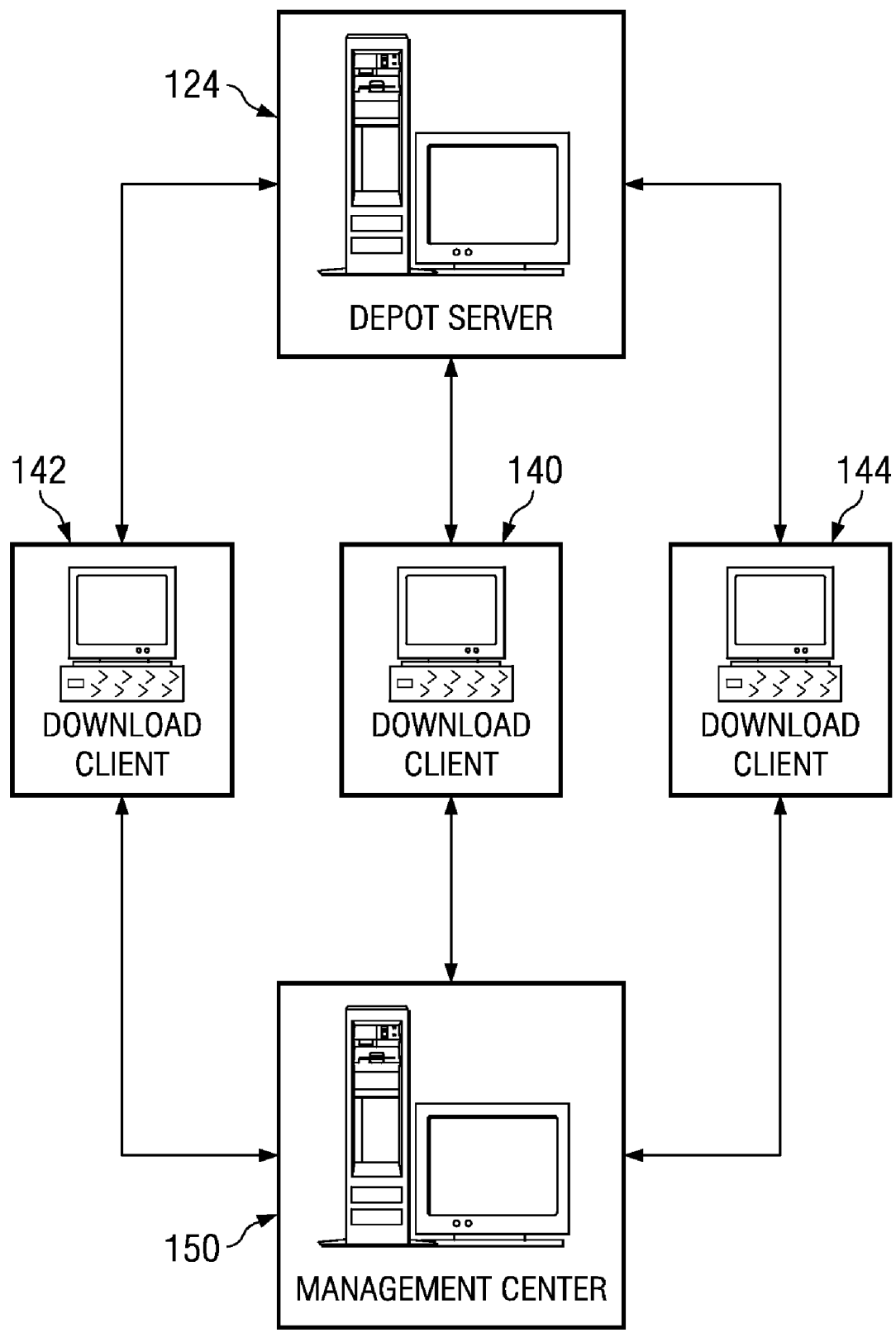
FIG. 2 is a schematic view illustrating interaction between selected components of the content delivery network of FIG. 1.

Referring to FIG. 2, there are shown each of the clients 140-144 of China region 104, wherein each client has been notified by the content distribution application that specified file content is going to be made available as described above. Upon requesting download of such content, each client 140-144 receives the download plan, and therefore knows that depot server 124, the closest server thereto, is a target depot server for the specified content. Accordingly, FIG. 2 shows all the clients 140-144 disposed to ask server 124 for the file content simultaneously, or within a narrow time window that may be on the order of seconds.

In order to establish a more efficient procedure for enabling each of the clients 140-142 to download the specified file content from closest depot server 124, server 124 is configured to operate, in response to a client, in one of a number of optional modes. These modes include the following, but are not necessarily limited thereto:

(1) If depot server 124 has finished replicating the specified file content when a client requests the content from the server, server 124 will immediately start serving the specified file content to the requesting client.

(2) If depot server 124 is in the process of replicating the specified file content when a client requests the content from the server, server 124 will estimate how much time is required to finish the replication. The server will then give the client a value representing this amount of time, whereupon the client places the server on hold. When the amount of time has elapsed, the client again asks the depot server 124 for the specified file content. If a second client requests the specified file content that is still replicating, server 124 will estimate how much time is required to finish the replication and add a specified amount of time since it is the second client requesting. In making estimate for subsequent clients requesting the same file, the depot server keeps track of the number of clients that have asked for the file previously. The depot server then adds time based on this number to its estimate. For example, it could add 5 seconds for each requesting client. In this example, if the first client was told to come back in 30 seconds and 10 seconds later the second client requests the same content, it will be told to come back in 20 sec+(1*5 sec)=25 seconds. If the third client asks for the same file one second later, it will be told to come back in 19 sec+(2*5 sec)=29 seconds. This is done to avoid having all clients come back at the exact same time that the depot server finishes downloading the file.

(3) If depot server 124 does not have the specified file content when a client requests the content from the server, server 124 will return a file not found error message to the requesting client. If the download plan the client has indicates that the depot server is in a pending state to get the file, the client understands therefrom that it must wait a predefined amount of time, e.g. 60 seconds, before asking the server again for the specified content. However, if the download plan indicates that the depot server is supposed to have the file already, the client reports the depot server to the management center. The client does not retry that depot server again.

When downloading a file using CDN 100, a client can open connections to multiple servers, and can simultaneously retrieve different segments of a file from the different servers. The above set of modes would be available to each of the multiple servers. Clients can also be configured to retrieve a file or file segments from peers, that is, other clients that have previously downloaded the same file or file segments.

Figure 3:
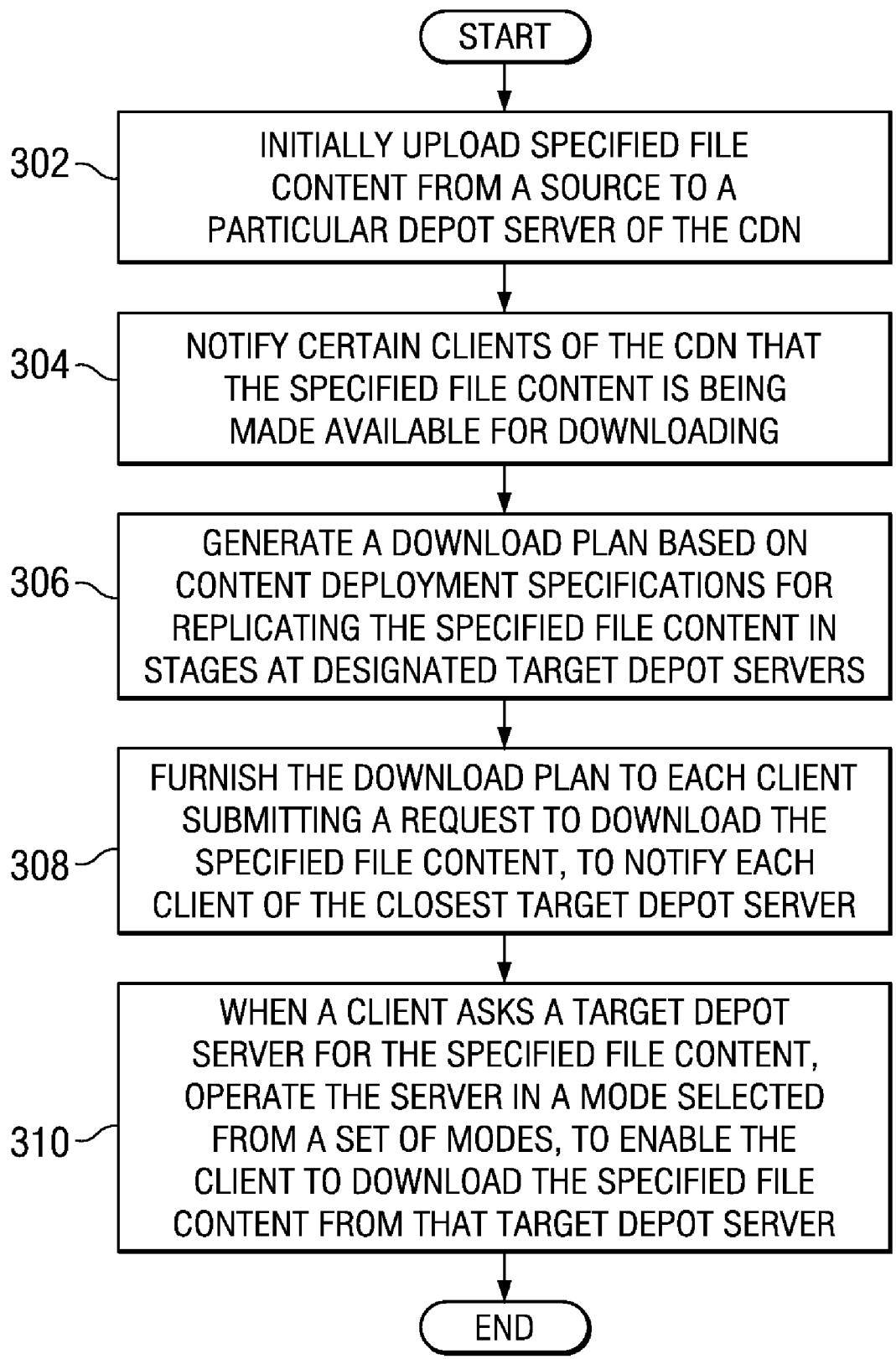
FIG. 3 is a flow chart showing steps for an embodiment of the invention.

FIG. 3 is a flow chart setting forth principal steps in operating CDN 100 in accordance with an embodiment of the invention. At step 302, specified file content is initially uploaded from a source to a particular depot server. As described above, the source can comprise a client that originally contained the specified content. At step 304, immediately after uploading the specified file content to the particular depot server, certain clients of the CDN 100 are notified that the content is being made available for downloading. These clients could include those known to need the specified file content. A download plan based on content deployment specifications is generated at step 306 by the content distribution application, as described above. The plan provides for replicating the specified file content in stages, at designated target depot servers.

At step 308, the download plan is furnished to each client that submits a request to download the specified content, in order to notify respective clients of the closest target depot server. Finally, in accordance with step 310, when a client asks the target depot server for the specified file content, the server is operated in one of the modes described above. These modes are collectively selected to ensure that any client requesting the specified file content can at some time, either immediately or later, download the file content from the closest target depot server.

Figure 4:
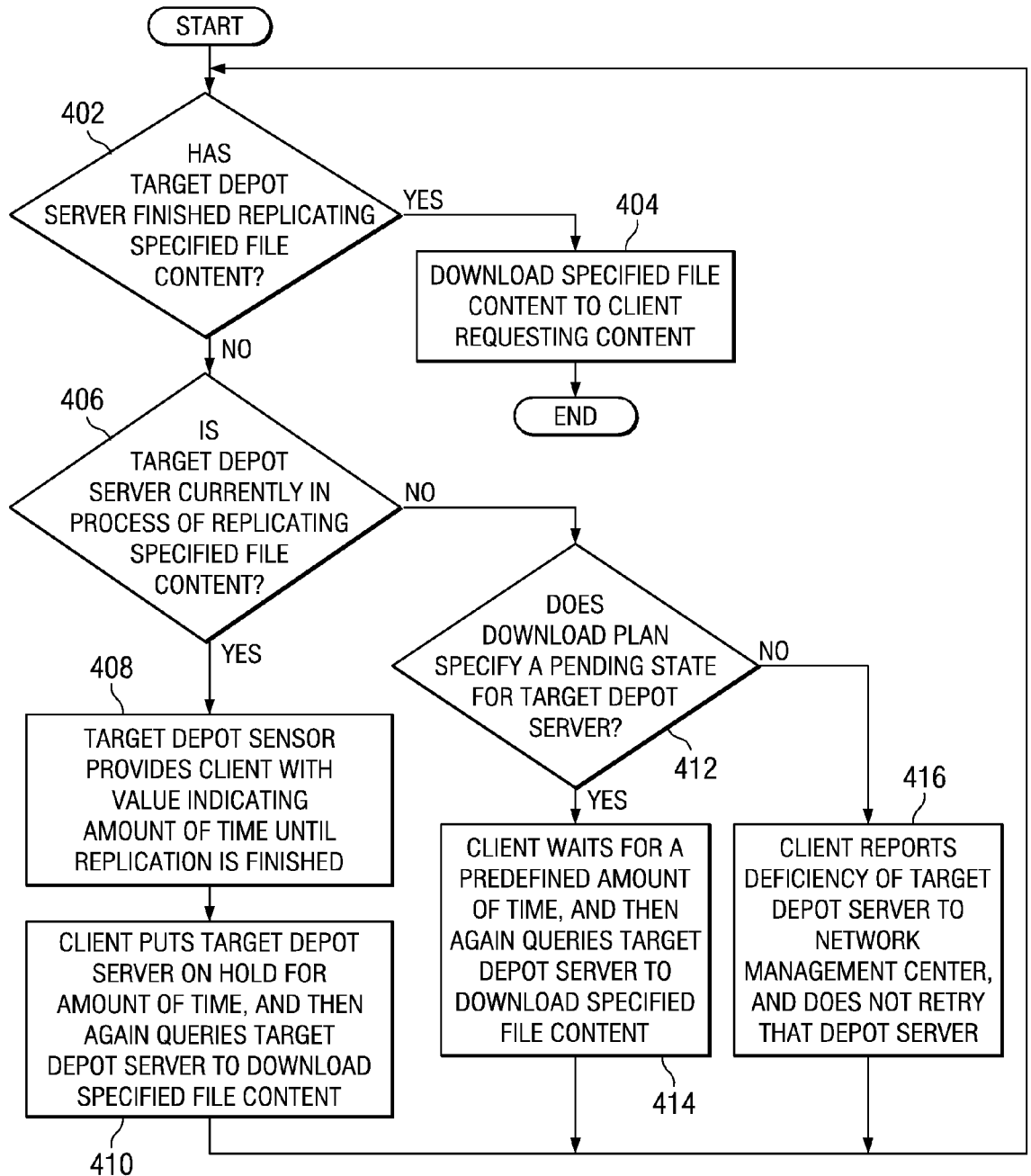
FIG. 4 is a flow chart showing steps in operating a target depot server in an embodiment of the invention.

Referring to FIG. 4, there is shown a flow chart pertaining to operation of a target depot server in different optional modes, as described above. At step 402, it is determined whether or not the target depot server has finished replicating specified file content. If it has finished, step 404 indicates that the content is downloaded to a client requiring the specified content. However, if the target depot server has not finished replicating the specified file content, it must be determined if the target depot server is currently in the process of replicating the specified file content, as provided by step 406. As shown by steps 408 and 412, if the server is currently replicating the file content, the target depot server provides the client with a value indicating the amount of time until replication is finished. The client then puts the target depot server on hold for this amount of time, and thereafter again queries the target depot server to download the specified file content.

If step 406 has a negative result, it is necessary to determine at step 412 whether the download plan specifies a pending state for the target depot. If it does, the client waits for a predefined amount of time, such as 60 seconds, and then again queries the target depot server to download the specified file content, as shown by step 414. Otherwise, as shown by step 416, the client reports to the network management center that the target depot server does not have the specified file. The client does not retry that depot server again.

Figure 5:
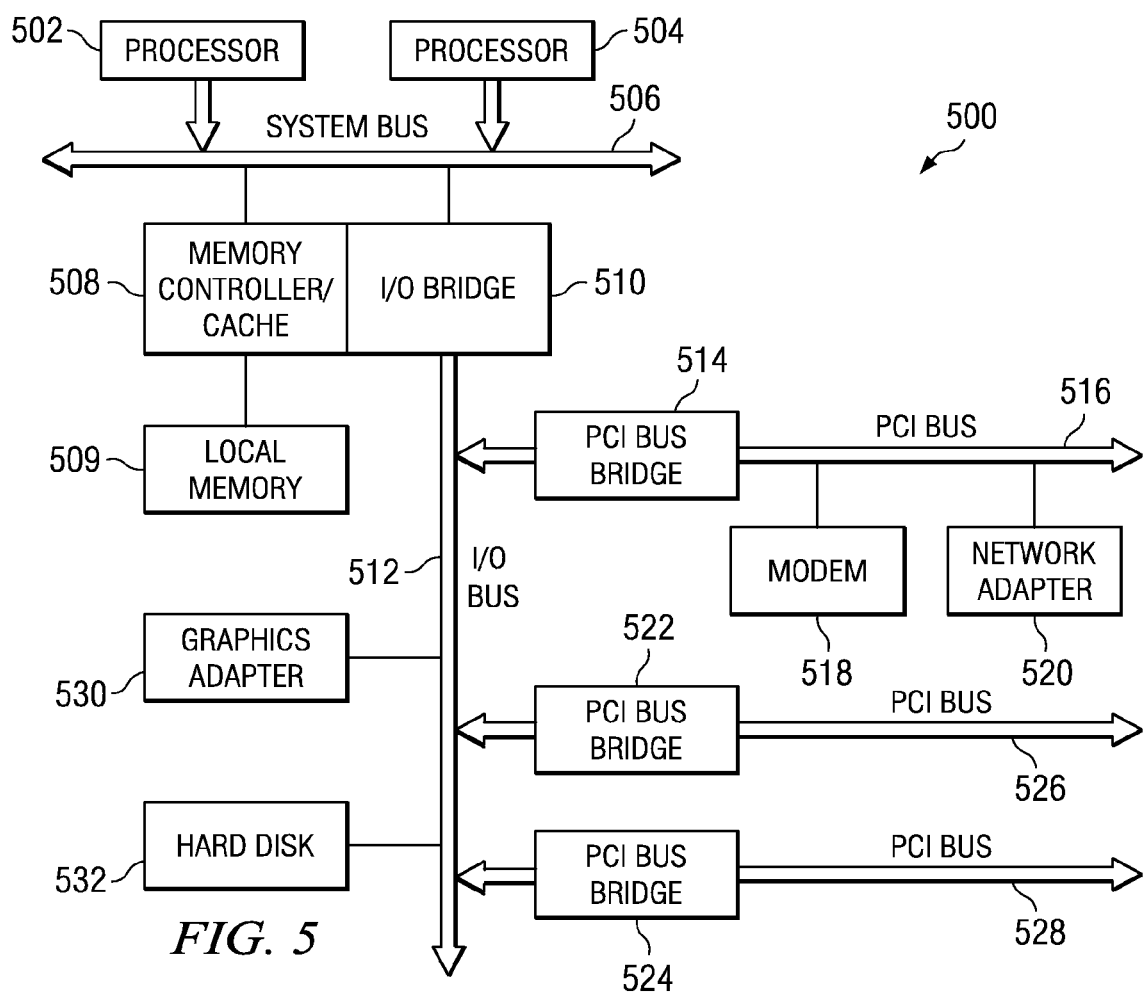
FIG. 5 is a block diagram depicting a data processing system that may be implemented as a server in the content delivery data network of FIG. 1.

With reference now to FIG. 5, a block diagram depicts a data processing system 500 that may be implemented as a server, to provide one of the depot servers for CDN 100 of FIG. 1. Data processing system 500 may be a symmetric multiprocessor (SMP) system including a plurality of processors 502 and 504 connected to system bus 506. Alternatively, a single processor system may be employed. Also connected to system bus 506 is memory controller/cache 508, which provides an interface to local memory 509. I/O bus bridge 510 is connected to system bus 506 and provides an interface to I/O bus 512. Memory controller/cache 508 and I/O bus bridge 510 may be integrated as depicted.

Peripheral component interconnect (PCI) bus bridge 514 connected to I/O bus 512 provides an interface to PCI local bus 516. A number of modems may be connected to PCI bus 516. Communication links may be provided through modem 518 and network adapter 520 connected to PCI local bus 516 through add-in boards.

Additional PCI bus bridges 522 and 524 provide interfaces for additional PCI buses 526 and 528, from which additional modems or network adapters may be supported. In this manner, data processing system 500 allows connections to multiple network computers. A memory-mapped graphics adapter 530 and hard disk 532 may also be connected to I/O bus 512 as depicted, either directly or indirectly.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention. The data processing system depicted in FIG. 5 may be, for example, an IBM RISC/System 6000 system, a product of International Business Machines Corporation in Armonk, N.Y., running the Advanced Interactive Executive (AIX) operating system. Alternatively, the operating system may be another commercially available operating system such as JavaOS For Business™ or OS/2™, which are also available from IBM.

Figure 6:
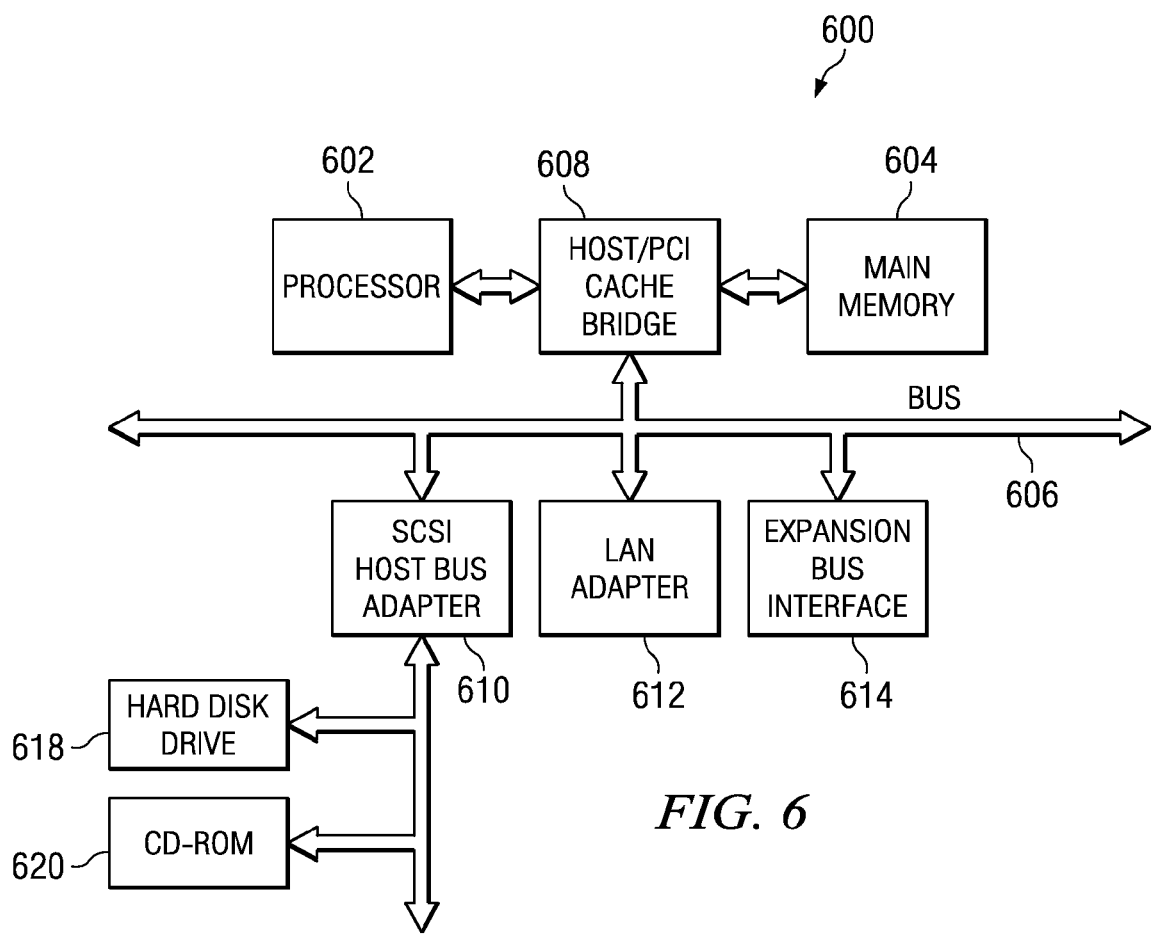
FIG. 6 is a block diagram depicting a data processing system that may be implemented as a client in the content delivery network of FIG. 1.

Referring to FIG. 6, there is shown a block diagram of a generalized data processing system 600 which may be implemented as a client for CDN 100. Data processing system 600 exemplifies a computer, in which code or instructions for implementing processes associated with the present invention may be located. Data processing system 600 usefully employs a peripheral component interconnect (PCI) local bus architecture, although other bus architectures may alternatively be used. FIG. 6 shows a processor 602 and main memory 604 connected to a PCI local bus 606 through a Host/PCI bridge 608. PCI bridge 608 also may include an integrated memory controller and cache memory for processor 602.

Referring further to FIG. 6, there is shown a local area network (LAN) adapter 612, a small computer system interface (SCSI) host bus adapter 610, and an expansion bus interface 614 respectively connected to PCI local bus 606 by direct component connection. SCSI host bus adapter 610 provides a connection for hard disk drive 618, and also for CD-ROM drive 620.

An operating system runs on processor 602 and is used to coordinate and provide control of various components within data processing system 600 shown in FIG. 6. The operating system may be a commercially available operating system such as Windows XP, which is available from Microsoft Corporation. Instructions for the operating system and for applications or programs are located on storage devices, such as hard disk drive 620, and may be loaded into main memory 604 for execution by processor 602.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a content delivery network comprising multiple depot servers positioned at different locations, and further comprising clients that are respectively located closer to one of said depot servers than to other of said depot servers, a method for distributing specified file content to said clients comprising the steps of:

initially uploading said specified content and a deployment specification to a particular one of said depot servers, wherein the deployment specification identifies clients of the content delivery network that need to receive the specified content;

generating a download plan for replicating said specified content at one or more other depot servers in successive stages, wherein each of said other depot servers is designated as a target depot server based on a proximity or association of depot servers to clients of the content delivery network that need to receive the specified content;

notifying the clients of the content delivery network that need to receive the specified content, when the uploading of said specified content to said particular depot server is completed, that said specified content is being made available for downloading; and receiving a request for the specified content from a requesting client of the clients of the content delivery network that need to receive the specified content; and responsive to receiving the request, sending the requesting client the download plan that identifies the target depot server that will serve the specified content to the requesting client; and operating, by a processor, a selected target depot server in one or more modes selected from a set of modes, wherein one of said modes comprises immediately serving said specified content to a given client from said selected target server, and another of said modes comprises notifying said given client of the amount of time remaining until said selected target server will complete a set of content distribution activities that include replicating said specified content to the selected target server, and serving said specified content to a set of clients of the selected target server that have requested said specified content, and then adding the given client to the set of clients of the selected target server requesting said specified content.

2. The method of claim 1, wherein: a further mode of said set comprises returning a file not found error to a given client, and notifying the given client that said selected target server is not in a pending state to receive said specified content, whereupon the given client reports said error to a network management center.

3. The method of claim 1, wherein: a further mode of said set comprises notifying a given client requesting said specified content from said selected target server that said requesting client should wait for a pre-specified time, and then repeat said request.

4. The method of claim 1, wherein: upon being furnished with said amount of time, a given client requesting said specified content places said selected target server on hold until said amount of time elapses, whereupon said client again requests that said selected target server download said specified content to said given client.

5. The method of claim 1, wherein: said selected target depot server is the closest depot server to said given client.

6. The method of claim 1, wherein: said multiplicity of clients are all enabled to download said specified content from said selected target depot server within a specified time window.

7. The method of claim 1, wherein: said selected target server and each client of said multiplicity comprise respective interconnected components of a local area network.

8. The method of claim 1, wherein: said specified file content comprises a segment of a file, wherein said client is disposed to download said file segment from said selected target depot server, while at the same time downloading one or more other file segments from one or more other depot server.

9. In a content delivery network comprising multiple depot servers positioned at different locations, and further comprising clients that are respectively located closer to one of said depot servers than to other of said depot servers, a computer program product in a computer readable medium, that is not a signal or a carrier wave, for distributing specified file content to said clients, comprising:

first instructions for initially uploading said specified content and a deployment specification to a particular one of said depot servers, wherein the deployment specification identifies clients of the content delivery network that need to receive the specified content;

second instructions for generating a download plan for replicating said specified content at one or more other depot servers in successive stages, wherein each of said other depot servers is designated as a target depot server based on a proximity or association of depot servers to clients of the content delivery network that need to receive the specified content;

third instructions for notifying the clients of the content delivery network that need to receive the specified content, when the uploading of said specified content to said particular depot server is completed, that said specified content is being made available for downloading; and fourth instructions for receiving a request for the specified content from a requesting client of the clients of the content delivery network that need to receive the specified content; and responsive to receiving the request, sending the requesting client the download plan that identifies the target depot server that will serve the specified content to the requesting client; and fifth instructions for operating, by a processor, a selected target depot server in one or more modes selected from a set of modes, wherein one of said modes comprises immediately serving said specified content to a given client from said selected target server, and another of said modes comprises notifying said given client of the amount of time remaining until said selected target server will complete a set of content distribution activities that include replicating said specified content to the selected target server, and serving said specified content to a set of clients of the selected target server that have requested said specified content, and then adding the given client to the set of clients of the selected target server requesting said specified content.

10. The computer program product of claim 9, wherein: a further mode of said set comprises returning a file not found error to a given client and notifying the given client that said selected target server is not in a pending state to receive said specified content, whereupon the given client reports said error to a network management center.

11. The computer program product of claim 9, wherein: a further mode of said set comprises notifying a given client requesting said specified content from said selected target server that said requesting client should wait for a pre-specified time, and then repeat said request.

12. The computer program product of claim 9, wherein: upon being furnished with said amount of time, a given client requesting said specified content places said selected target server on hold until said amount of time elapses, whereupon said client again requests that said selected target server download said specified content to said given client.

13. The computer program product of claim 9, wherein: said selected target depot server is the closest depot server to said given client.

14. The computer program product of claim 9, wherein: said multiplicity of clients are all enabled to download said specified content from said selected target depot server within a specified time window.

15. In a content delivery network comprising multiple depot servers positioned at different locations, and further comprising clients that are respectively located closer to one of said depot servers than to other of said depot servers, an apparatus for distributing specified file content to said clients comprising: a first component for initially uploading said specified content and a deployment specification to a particular one of said depot servers, wherein the deployment specification identifies clients of the content delivery network that need to receive the specified content;

a second component for generating a download plan for replicating said specified content at one or more other depot servers in successive stages, wherein each of said other depot servers is designated as a target depot server based on a proximity or association of depot servers to clients of the content delivery network that need to receive the specified content;

a third component for notifying the clients of the content delivery network that need to receive the specified content, when the uploading of said specified content to said particular depot server is completed, that said specified content is being made available for downloading; and a fourth component for receiving a request for the specified content from a requesting client of the clients of the content delivery network that need to receive the specified content; and responsive to receiving the request, sending the requesting client the download plan that identifies the target depot server that will serve the specified content to the requesting client; and a fifth component for operating, by a processor, a selected target depot server in one or more modes selected from a set of modes, wherein one of said modes comprises immediately serving said specified content to a given client from said selected target server, and another of said modes comprises notifying said given client of the amount of time remaining until said selected target server will complete a set of content distribution activities that include replicating said specified content to the selected target server, and serving said specified content to a set of clients of the selected target server that have requested said specified content, and then adding the given client to the set of clients of the selected target server requesting said specified content.

16. The apparatus of claim 15, wherein: said selected target depot sensor is operated in a further mode selected from said set to return a file not found error to a given client, and notify the given client that said selected target server is not in a pending state to receive said specified content, whereupon the given client reports said error to a network management center.

17. The apparatus of claim 15, wherein: said selected target depot sensor is operated in a further mode selected from said set to notify a given client requesting said specified content that said client should wait for a pre-specified time, and then repeat said request.

18. The apparatus of claim 15, wherein: upon being furnished with said amount of time, a given client requesting said specified content places said selected target server on hold until said amount of time elapses, whereupon said client again requests that said selected target server download said specified content to said given client.

19. The apparatus of claim 15, wherein: said selected target depot server is the closest depot server to said given client.

20. The apparatus of claim 15, wherein: said selected target server and each client of said multiplicity comprise respective interconnected components of a local area network.

* * * * *